US009016535B2

(12) United States Patent
Hasegawa et al.

(10) Patent No.: US 9,016,535 B2
(45) Date of Patent: Apr. 28, 2015

(54) FIBER CLEAVER

(75) Inventors: Masahiro Hasegawa, Yokohama (JP); Toshihiko Homma, Yokohama (JP)

(73) Assignees: SEI Optifrontier Co., Ltd., Yokohama (JP); Sumitomo Electric Industries, Ltd., Osaka (JP)

( * ) Notice: Subject to any disclaimer, the term of this patent is extended or adjusted under 35 U.S.C. 154(b) by 170 days.

(21) Appl. No.: 13/701,311

(22) PCT Filed: Jun. 22, 2011

(86) PCT No.: PCT/JP2011/064217
§ 371 (c)(1),
(2), (4) Date: Nov. 30, 2012

(87) PCT Pub. No.: WO2012/002202
PCT Pub. Date: Jan. 5, 2012

(65) Prior Publication Data
US 2013/0075440 A1    Mar. 28, 2013

(30) Foreign Application Priority Data
Jun. 28, 2010 (JP) .................................. 2010-146523

(51) Int. Cl.
*B26F 3/00* (2006.01)
*B65H 35/00* (2006.01)
*G02B 6/25* (2006.01)

(52) U.S. Cl.
CPC ........................................ *G02B 6/25* (2013.01)

(58) Field of Classification Search
CPC ..................................................... G02B 6/25
USPC ................... 225/96, 373, 374, 375, 376, 377, 225/388–391, 96.5; 83/879–887, 425, 83/425.4, 471.2, 471.3, 472, 473, 477, 83/477.1, 490, 485, 486, 486.1, 487
See application file for complete search history.

(56) References Cited

U.S. PATENT DOCUMENTS 5,123,581 A * 6/1992 Curtis et al. ....................... 225/2
6,997,091 B1 * 2/2006 Shibata ............................ 83/399
(Continued)

FOREIGN PATENT DOCUMENTS

CN         2522230 Y     11/2002
CN    200972517 Y     11/2007
(Continued)

OTHER PUBLICATIONS

Chinese Office Action of the corresponding Chinese Patent Application No. 201180031754.8, dated Jun. 5, 2014.
(Continued)

*Primary Examiner* — Ned Landrum
*Assistant Examiner* — Richard Crosby, Jr.
(74) *Attorney, Agent, or Firm* — Global IP Counselors, LLP

(57) ABSTRACT

A fiber cleaver is provided in which a circular blade can be efficiently used without increasing the workload imposed on the worker. The fiber cleaver includes a main body supporting a slider such that the slider is movable in the front-back direction. A disc-shaped circular blade configured to make a flaw in an optical fiber is rotatably provided to the slider. A columnar protrusion stands on a base of the main body. An engaging member engaging with a gear that rotates together with the circular blade is provided at the upper end of the columnar protrusion. The columnar protrusion is connected to an engaging member, which engages with the slider, with a spring interposed therebetween. The base has first to third recessed portions each anchoring the engaging member. The angle of rotation of the circular blade is changed among three angles with the position where the engaging member is anchored.

5 Claims, 7 Drawing Sheets

(56) References Cited

U.S. PATENT DOCUMENTS

| | | |
|---|---|---|
| 7,669,744 B2 * | 3/2010 | Yazaki et al. .................. 225/1 |
| 2003/0113087 A1 | 6/2003 | Lee et al. |
| 2005/0169594 A1 | 8/2005 | Song |
| 2006/0201986 A1 | 9/2006 | Sasaki et al. |
| 2009/0031875 A1 * | 2/2009 | Ushiwata et al. ............ 83/471.3 |
| 2010/0163593 A1 * | 7/2010 | Song et al. .................... 225/96 |

FOREIGN PATENT DOCUMENTS

| | | |
|---|---|---|
| CN | 101573215 A | 11/2009 |
| EP | 1950588 A1 | 7/2008 |
| EP | 2687881 A1 | 1/2014 |
| JP | 2001-296430 A | 10/2001 |
| JP | 2005-301142 A | 10/2005 |
| JP | 2006-251034 A | 9/2006 |
| JP | 2008-203815 A | 9/2008 |
| JP | 2009-244403 A | 10/2009 |

OTHER PUBLICATIONS

Notice of Preliminary Rejection of the corresponding Korean Patent Application No. 10-2012-7034035, dated Aug. 25, 2014.

Extended European Search Report of the counterpart European Patent Application No. 11800667.5, dated Jan. 9, 2015.

* cited by examiner (a)

(b)

(a)

(b)

FIBER CLEAVER

CROSS-REFERENCE TO RELATED APPLICATIONS

This U.S. National stage application claims priority under 35 U.S.C. §119(a) to Japanese Patent Application No. 2010-146523, filed in Japan on Jun. 28, 2010, the entire contents of which are hereby incorporated herein by reference.

TECHNICAL FIELD

The present invention relates to a fiber cleaver.

BACKGROUND ART

Japanese Unexamined Patent Application Publication No. 2001-296430 discloses a fiber cleaver including a body having a holder guide to which an optical fiber holder is attached, a lid openably and closably provided on the upper surface of the body, a slider movable along a linear guide fixed to the body, and a circular blade fixed to the slider and making an initial flaw in an optical fiber.

In this fiber cleaver, if the circular blade is repeatedly used many times, the sharpness of the circular blade deteriorates. Therefore, it is proposed that the circular blade be rotatably attached to the slider and, when the sharpness of the circular blade has deteriorated, the circular blade is rotated by a certain angle such that the point of contact of the circular blade with respect to the optical fiber is changed. However, in such a case where the circular blade is rotated by the worker after members that fix the circular blade are loosened by the worker, the workload imposed on the worker increases and, moreover, it is difficult to appropriately change the point of contact of the circular blade with respect to the optical fiber. Hence, it is difficult to efficiently use the circular blade.

SUMMARY OF INVENTION

Technical Problem

It is an object of the present invention to provide a fiber cleaver in which a circular blade can be efficiently used without increasing the workload imposed on the worker.

Solution to Problem

To achieve the above object, there is provided a fiber cleaver including a main body including a fiber guiding portion that positions an optical fiber, a slider movably provided to the main body, a circular blade rotatably provided to the slider and configured to make a flaw in the optical fiber, and a circular-blade-rotating means configured to change the angle of rotation of the circular blade in accordance with the position of the slider that is moved in one direction with respect to the main body.

In a preferred embodiment, the circular-blade-rotating means of the fiber cleaver according to the present invention includes a rotary member configured to rotate together with the circular blade, and a protrusion fixed to the main body and including an engaging portion configured to engage with the rotary member. Furthermore, the circular-blade-rotating means preferably includes an engaging member provided to the protrusion with an elastic member interposed therebetween, the engaging member being configured to engage with the slider; and a plurality of anchoring portions provided to the main body and each configured to anchor the engaging member.

In another preferred embodiment, the fiber cleaver according to the present invention further includes a circular-blade-raising means configured to raise the circular blade with respect to the slider after the circular blade is rotated by the circular-blade-rotating means. In this case, the circular-blade-raising means preferably includes a circular-blade-mounting bracket provided to the slider in such a manner as to be movable vertically and to which the circular blade is attached, a wedge fixed to the main body and having a slant face slanting upward in the one direction, and an engaging pin provided to the circular-blade-mounting bracket and configured to engage with the slant face.

Advantageous Effects of Invention

According to the present invention, the circular blade can be efficiently used without increasing the workload imposed on the worker, and the life of the circular blade can be extended.

DESCRIPTION OF EMBODIMENTS

Figure 1:
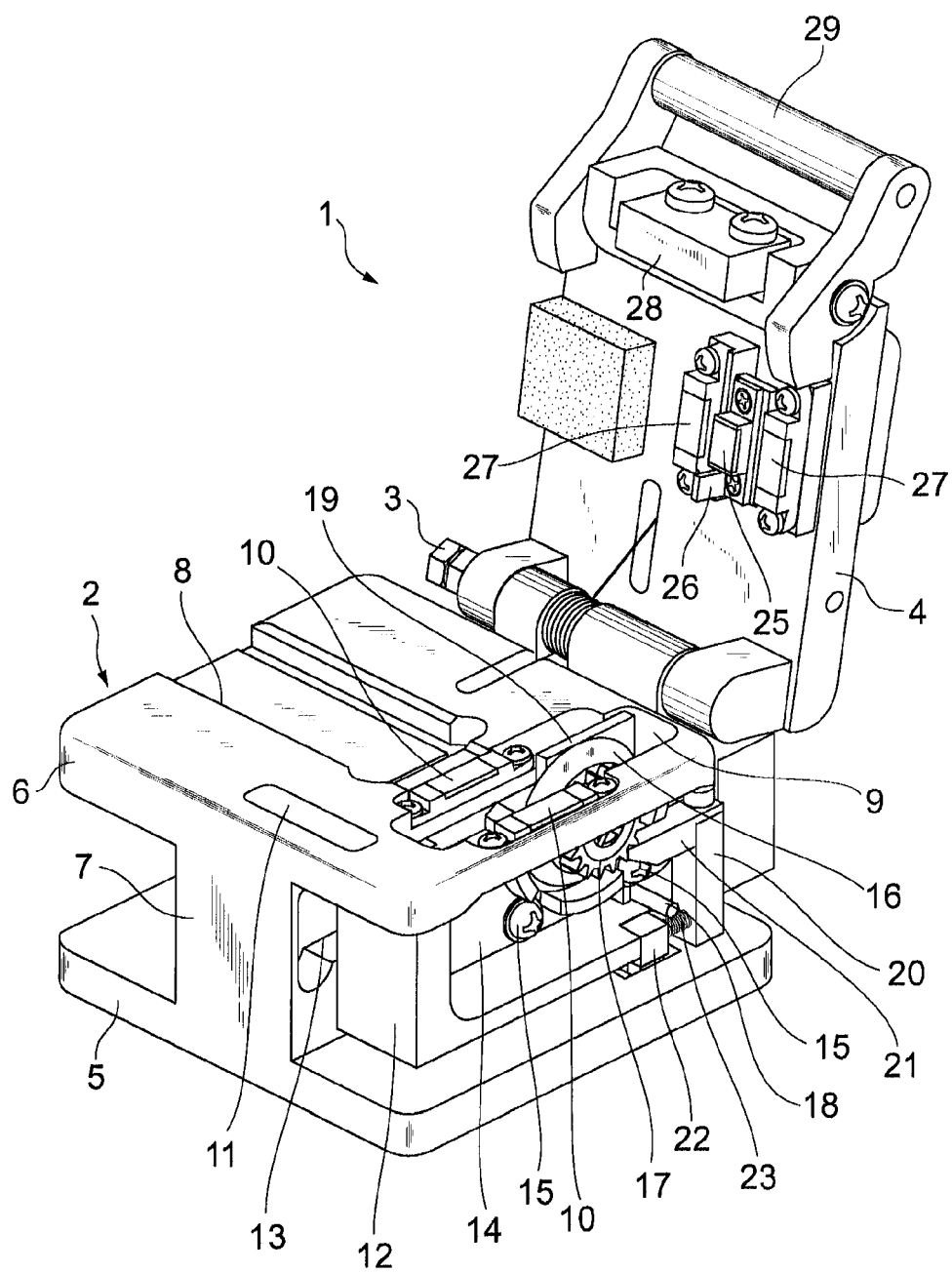
FIG. 1 is a perspective view of a fiber cleaver according to a first embodiment of the present invention seen from an operation side.

Embodiments of the present invention will now be described with reference to the drawings. The drawings are only for illustration and do not limit the scope of the invention. In the drawings, identical reference numerals denote same elements so that redundant description is avoided. The scale ratio in the drawings is not necessarily exact.

Figure 2:
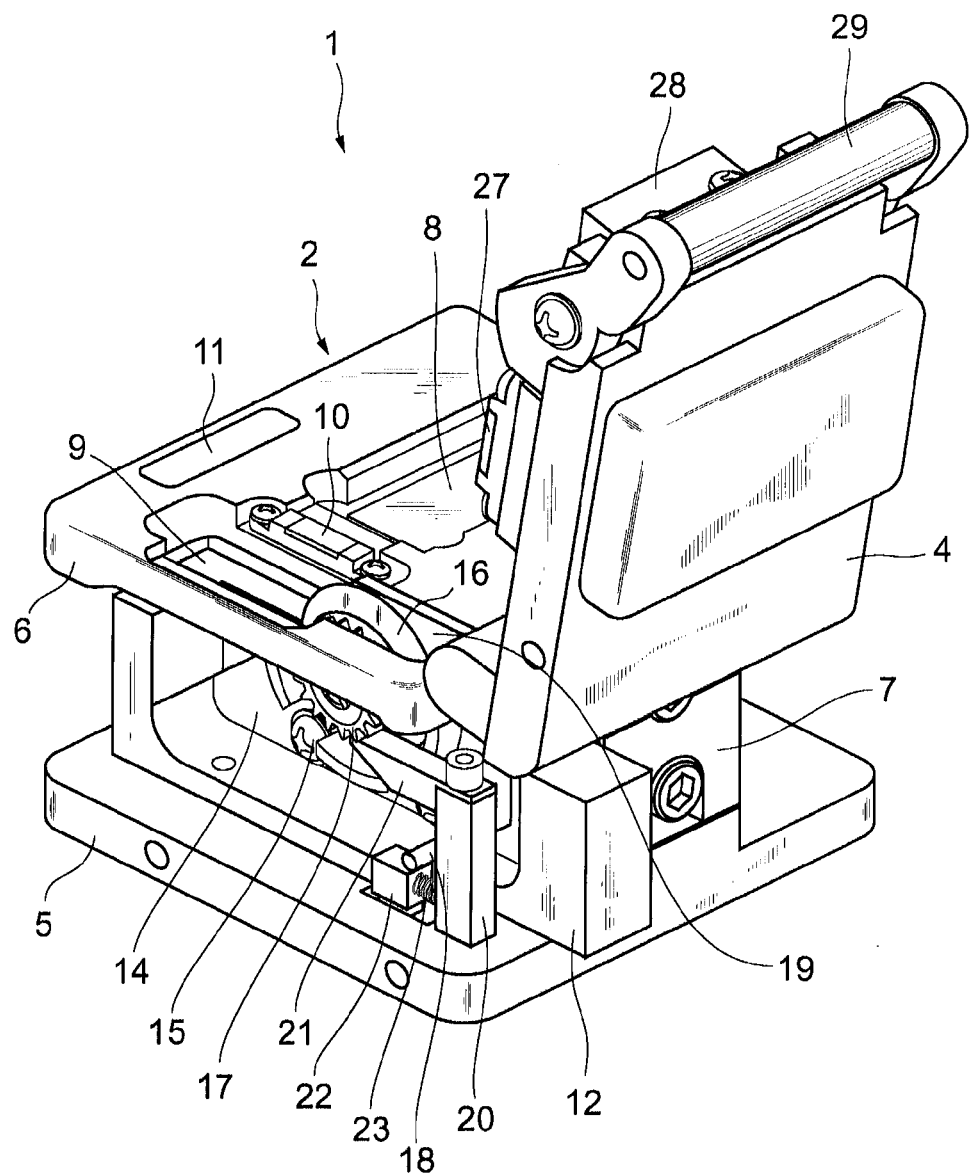
FIG. 2 is a perspective view of the fiber cleaver according to the First embodiment seen from the opposite side.

FIG. 1 is a perspective view of a fiber cleaver 1 according to a first embodiment of the present invention seen from an operation side. FIG. 2 is a perspective view of the fiber cleaver 1 seen from the opposite side. The fiber cleaver 1 includes a main body 2 having a substantially I-shaped cross section, and a lid 4 openably and closably connected to the main body 2 with a shaft 3. The main body 2 includes a base 5, a mount 6 provided above the base 5, and a connecting portion 7 connecting the base 5 and the mount 6 to each other.

The mount 6 has, in the upper surface thereof, a holder guide (fiber guiding portion) 8 that is a substantially rectangular recess and is provided for positioning a non-illustrated fiber holder. The mount 6 has, in a portion thereof adjacent to the holder guide 8, an opening 9 extending in the front-back direction of the main body 2 (in a direction orthogonal to the axis of the optical fiber to be placed on the mount 6 and in which a side nearer to an operation lever 29 is defined as front, and a side nearer to the shaft 3 is defined as rear, when the lid 4 is closed). The mount 6 also has, on the upper surface thereof, a pair of lower clamps 10 having rubber members, respectively, and fixed on both sides of the opening 9. The mount 6 also has a magnet receiver 11 at the front end of the upper surface thereof.

The main body 2 is provided with a slider 12 such that the slider 12 is movable in the front-back direction. The slider 12 is provided in a space between the base 5 and the mount 6 and moves in the front-back direction along a linear guide 13 provided in one side face of the connecting portion 7.

The slider 12 is provided with a circular blade mounting bracket 14 fixed thereto with two screws 15. A circular blade 16 having a disc-like shape and configured to make a flaw in the optical fiber is attached to the circular-blade-mounting bracket 14 such that part of the circular blade 16 projects upward from the opening 9. The circular blade 16 is provided with a gear 17 (a rotary member). The circular blade 16 and the gear 17 are rotatable together with respect to the circular-blade-mounting bracket 14.

The circular-blade-mounting bracket 14 is provided, at the lower rear thereof, with a pin 18 having a columnar shape and extending laterally with respect to the slider 12. The slider 12 is provided with a projection 19 provided at the top thereof and adjacent to the circular blade 16 in such a manner as to project upward from the opening 9.

The base 5 is provided with a columnar protrusion 20 standing from the rear of the upper surface thereof. The columnar protrusion 20 is provided, at the upper end thereof, with an arm-like engaging member 21 (engaging portion) extending toward the front and configured to engage with the gear 17.

Figure 3:
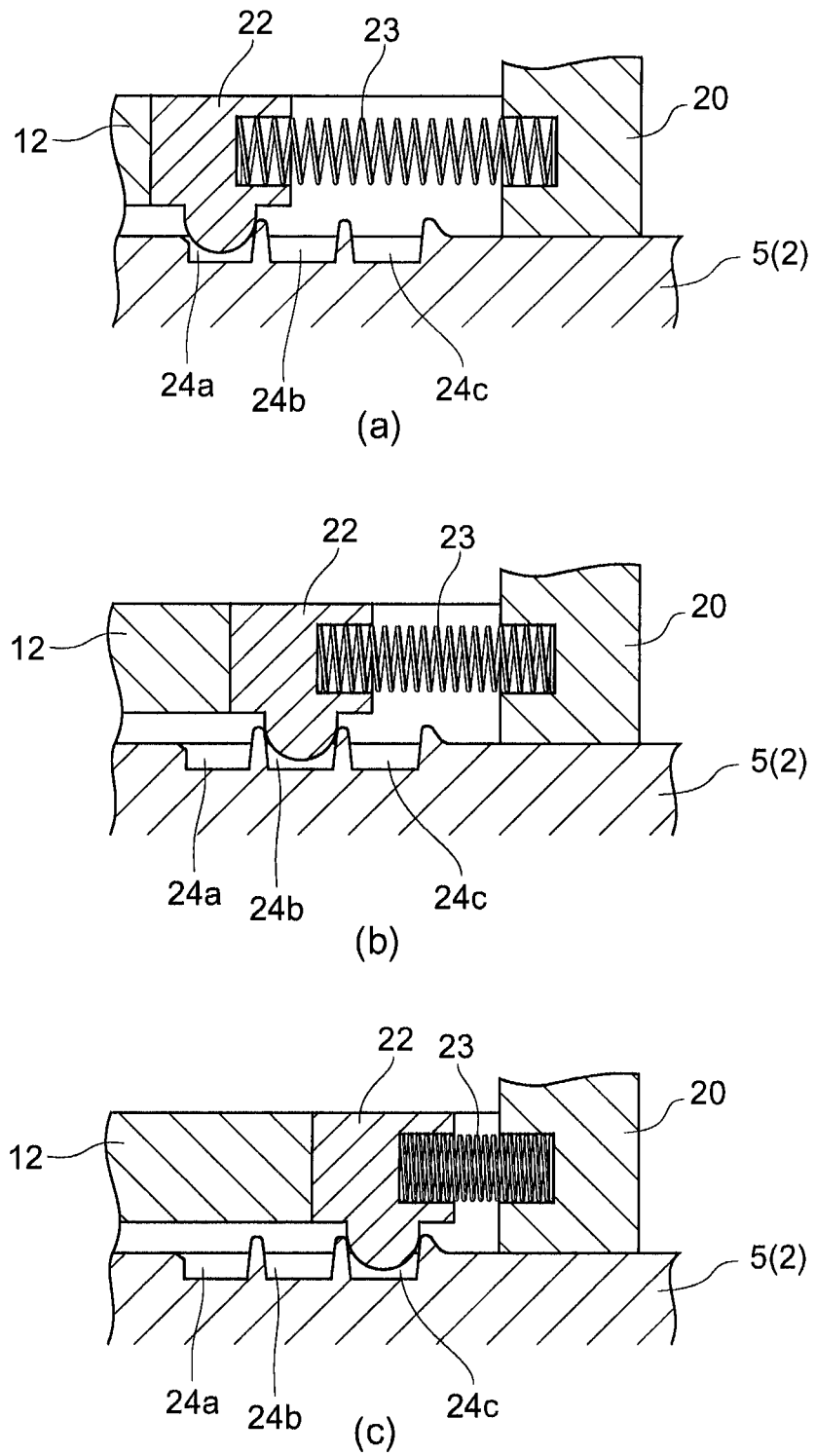
FIG. 3 includes cross-sectional views of an engaging member and a peripheral portion thereof; part (a), part (b), and part (c) illustrate the engaging member that is in engagement with first, second, and third recessed portions, respectively.

FIG. 3 includes cross-sectional views of an engaging member 22 and a peripheral portion thereof; part (a), part (b), and part (c) illustrate the engaging member 22 that is in engagement with first, second, and third recessed portions 24a, 24b, and 24c, respectively. The engaging member 22, which has a substantially block-like shape and is configured to engage with the slider 12, is provided on the front side with respect to the columnar protrusion 20. The engaging member 22 is connected to the columnar protrusion 20 with a spring 23 interposed therebetween. The engaging member 22 is provided in the form of for example, a ball plunger in which a spring is provided. Anchoring portions (the first recessed portion 24a to the third recessed portion 24c) that each position the engaging member 22 are provided in that order from the front side toward the rear side in the upper surface of the base 5 and on the front side with respect to the columnar protrusion 20. The first recessed portion 24a to the third recessed portion 24c each anchors the engaging member 22 when the lower end (a ball portion in the case of a ball plunger) of the engaging member 22 fits therein.

As FIGS. 1 and 2 show, the lid 4 is provided with an anvil 25 fixed to the back surface thereof. The anvil 25 has a rubber member and is configured to cleave the optical fiber by making a bend in the optical fiber in which a flaw has been made by the circular blade 16. The anvil 25 is urged by a non-illustrated spring in such a direction as to move away from the lid 4. The anvil 25 is provided with an engaging strip 26 configured to engage with the projection 19 when the lid 4 is closed in such a manner as to be placed onto the main body 2.

The lid 4 is provided, on the back surface thereof, with a pair of upper clamps 27 having rubber members, respectively, and fixed on both sides of the anvil 25. The upper clamps 27 function in combination with the lower clamps 10, respectively, in such a manner as to clamp the optical fiber placed on the mount 6. The lid 4 is also provided, at the tip (front end) of the back surface thereof, with the operation lever 29 and a magnet 28 that is to be attracted to the magnet receiver 11.

To cleave an optical fiber with the fiber cleaver 1, the optical fiber is first placed on the fiber holder. Subsequently, with the lid 4 open, the fiber holder is set in the holder guide 8 provided in the mount 6 of the main body 2.

Subsequently, in a state where the slider 12 is at the frontmost position (initial position) with respect to the main body 2, the lid 4 is closed. Then, the optical fiber is pinched between the clamps 10 and 27. Furthermore, the engaging strip 26 provided on the lid 4 comes into contact with the projection 19 of the slider 12, whereby the anvil 25 is retained in a state where the spring is compressed.

Subsequently, the slider 12 is moved toward the rear with respect to the main body 2. Then, the circular blade 16 comes into contact with the optical fiber, whereby a flaw is made in the optical fiber.

When the slider 12 is further moved toward the rear, the projection 19 goes over the engaging strip 26. Hence, the anvil 25 is lowered by the restoring force of the spring and comes into contact with and pushes the optical fiber. Since the leading side and the trailing side of the optical fiber are held by the clamps 10 and 27, the optical fiber is bent. Consequently, the optical fiber breaks starting from the flaw that has been made therein.

Figure 4:
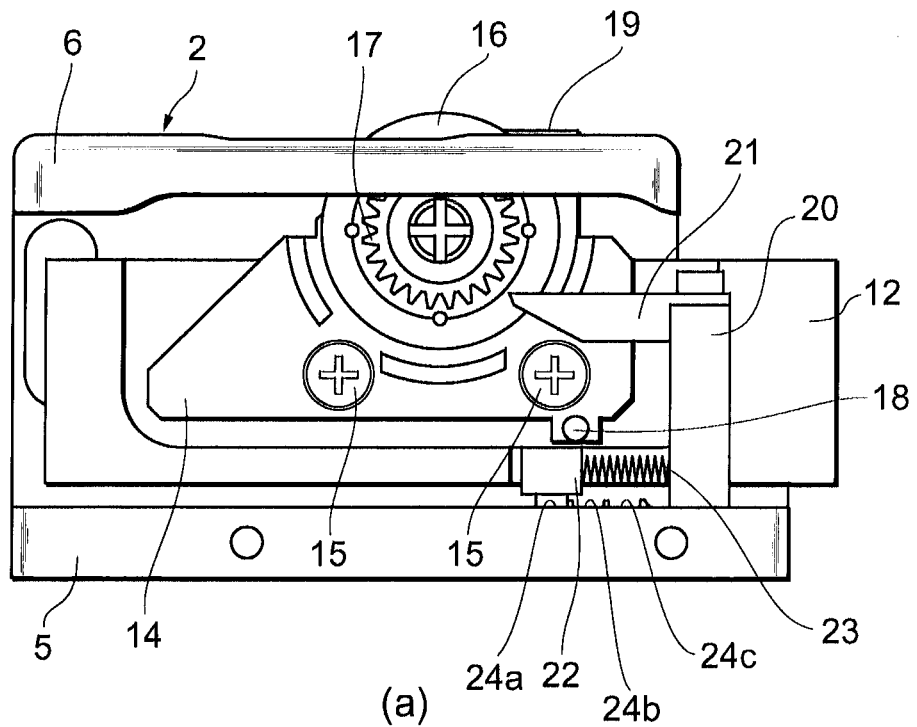
FIG. 4 includes side views of a main body of the fiber cleaver according to the first embodiment; part (a) illustrates a state where the engaging member is not in contact with a slider, and part (b) illustrates a state where the engaging member is in contact with the slider and is in engagement with the first recessed portion.
Figure 4:
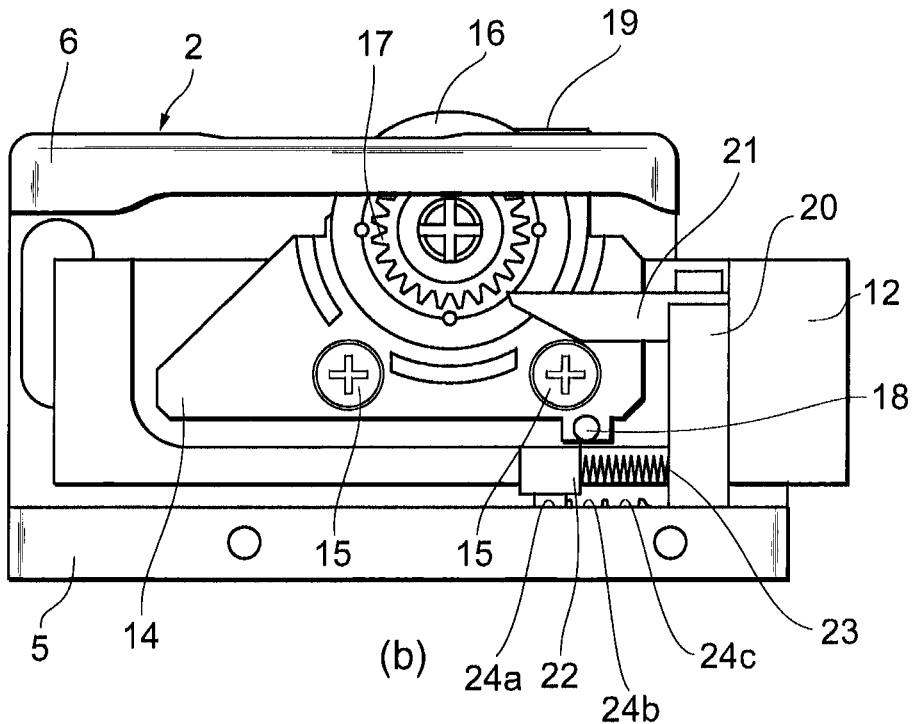

Immediately after the optical fiber is cleaved as described above, the slider 12 is not in contact with the engaging member 22 that is anchored at the first recessed portion 24a and, therefore, the gear 17 is not in contact with the engaging member 21 provided on the columnar protrusion 20 (part (a) of FIG. 4). When the slider 12 in this state is further moved toward the rear, the slider 12 comes into contact with the engaging member 22 that is anchored at the first recessed portion 24a (part (b) of FIG. 4). In this state, however, the gear 17 is not in contact with the engaging member 21.

When the slider 12 is further moved toward the rear, the slider 12 pushes the engaging member 22 such that the spring 23 is compressed. Thus, the lower end of the engaging member 22 goes out of the first recessed portion 24a and fits into the second recessed portion 24b, where the engaging member 22 is anchored (part (b) of FIG. 3 and part (a) of FIG. 5). In this process, the gear 17 comes into contact with the engaging member 21, and the engaging member 21 causes the gear 17 to rotate in the direction of the arrow by α degrees from the state illustrated in part (b) of FIG. 4. Consequently, the circular blade 16 rotates by α degrees from the same state.

When the slider 12 is further moved toward the rear, the slider 12 pushes the engaging member 22 such that the spring 23 is further compressed. Thus, the lower end of the engaging member 22 goes out of the second recessed portion 24b and fits into the third recessed portion 24c, where the engaging member 22 is anchored (part (c) of FIG. 3 and part (b) of FIG.

5). In this process, the engaging member 21 causes the gear 17 to further rotate in the direction of the arrow. Specifically, the gear 17 rotates by β (>α) degrees from the state illustrated in part (b) of FIG. 4. Consequently, the circular blade 16 rotates by β degrees from the same state.

As described above, the angle of rotation of the circular blade 16 is simply changeable among three angles of zero degrees, α degrees, and β degrees in conjunction with the position where the engaging member 22 is anchored, the position being determined in accordance with the position of the slider 12 that is moved toward the rear with respect to the main body 2. Thus, the angle of rotation of the circular blade 16 is changeable stepwise in accordance with the condition of the circular blade 16 and so forth.

Specifically, if there is no special problem with the sharpness of the circular blade 16 in the last performance of cleaving the optical fiber, there is no need to change the point of contact of the circular blade 16 with respect to the optical fiber. Therefore, when the slider 12 comes into contact with the engaging member 22 (part (b) of FIG. 4), the slider 12 is returned to the initial position. That is, the slider 12 is returned to the initial position without rotating the circular blade 16.

Figure 5:
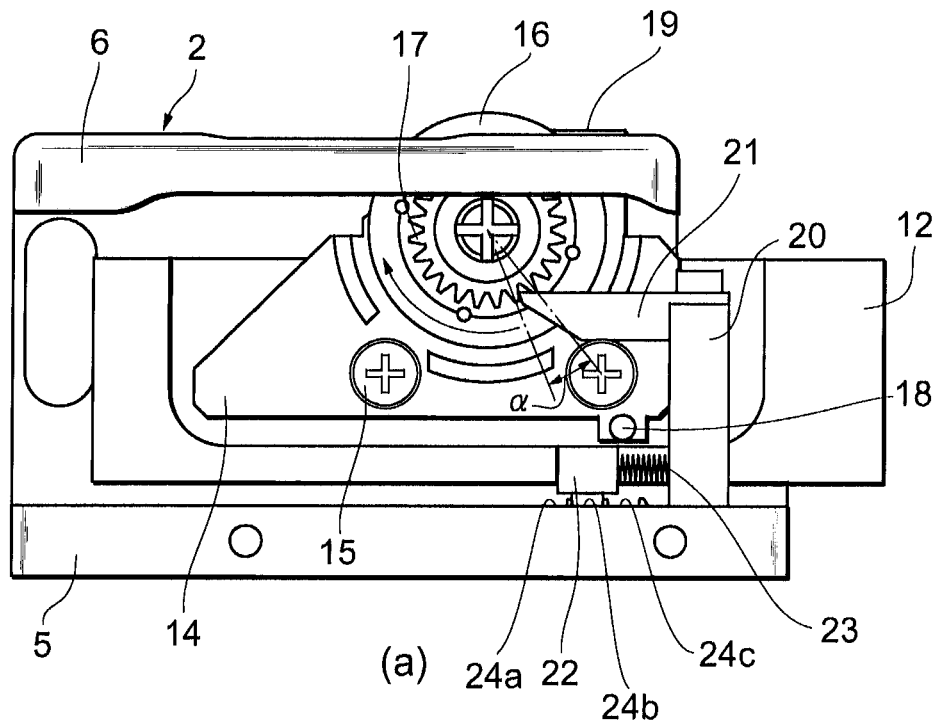
FIG. 5 includes side views of the main body of the fiber clever according to the first embodiment; part (a) illustrates a state where the engaging member is in contact with the slider and is in engagement with the second recessed portion, and part (b) illustrates a state where the engaging member is likewise in engagement with the third recessed portion.
Figure 5:
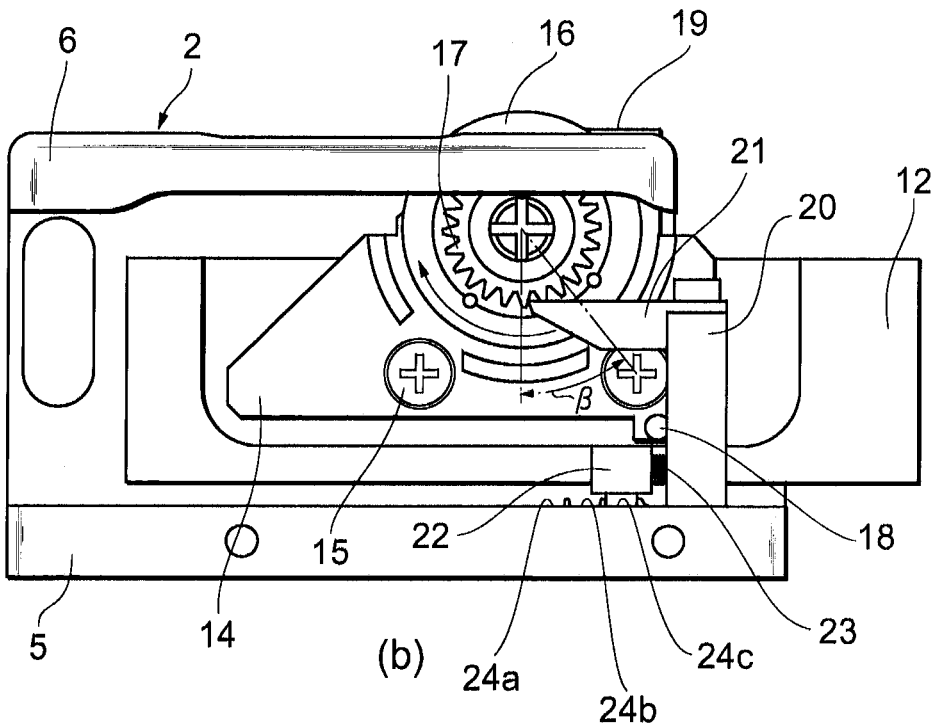

If it is determined that the sharpness of the circular blade 16 has deteriorated in the last performance of cleaving the optical fiber, the engaging member 22 is pushed with the slider 12 to the second recessed portion 24b (part (a) of FIG. 5) so that the point of contact of the circular blade 16 with respect to the optical fiber is changed. Thus, the circular blade 16 is rotated by α degrees. Subsequently, the slider 12 is returned to the initial position.

However, for example, if there are any chipping or the like at the point of contact of the circular blade 16 with respect to the optical fiber in a state where the circular blade 16 has been rotated by α degrees, the engaging member 22 is pushed with the slider 12 to the third recessed portion 24c (part (b) of FIG. 5) so that the point of contact of the circular blade 16 with respect to the optical fiber is further changed. Thus, the circular blade 16 is eventually rotated by β degrees. Subsequently, the slider 12 is returned to the initial position.

In the above configuration, the gear 17, the columnar protrusion 20, the engaging members 21 and 22, the spring 23, and the first recessed portion 24a to the third recessed portion 24c in combination form a circular-blade-rotating means that rotates the circular blade 16. The circular-blade-rotating means is configured to change the angle of rotation of the circular blade 16 in accordance with the position of the slider 12 that is moved with respect to the main body 2.

As described above, in the fiber cleaver 1 according to the first embodiment, the angle of rotation of the circular blade 16 changes stepwise by simply changing the position of the slider 12 with respect to the main body 2. Therefore, the circular blade 16 is rotatable without imposing extra workload on the worker. Furthermore, the angle of rotation of the circular blade 16 only needs to be set appropriately in accordance with the condition of the circular blade 16 including sharpness, chipping, and the like. Therefore, the circular blade 16 can be used efficiently over substantially the entirety of the circumference thereof. Consequently, the life of the circular blade 16 can be extended sufficiently. Moreover, appropriate part of the circular blade 16 that is sharp and has no chipping and the like can be always used in making a flaw in the optical fiber. Therefore, when the optical fiber is broken by using the anvil 25, the broken optical fiber is prevented from having a defective end facet.

Figure 6:
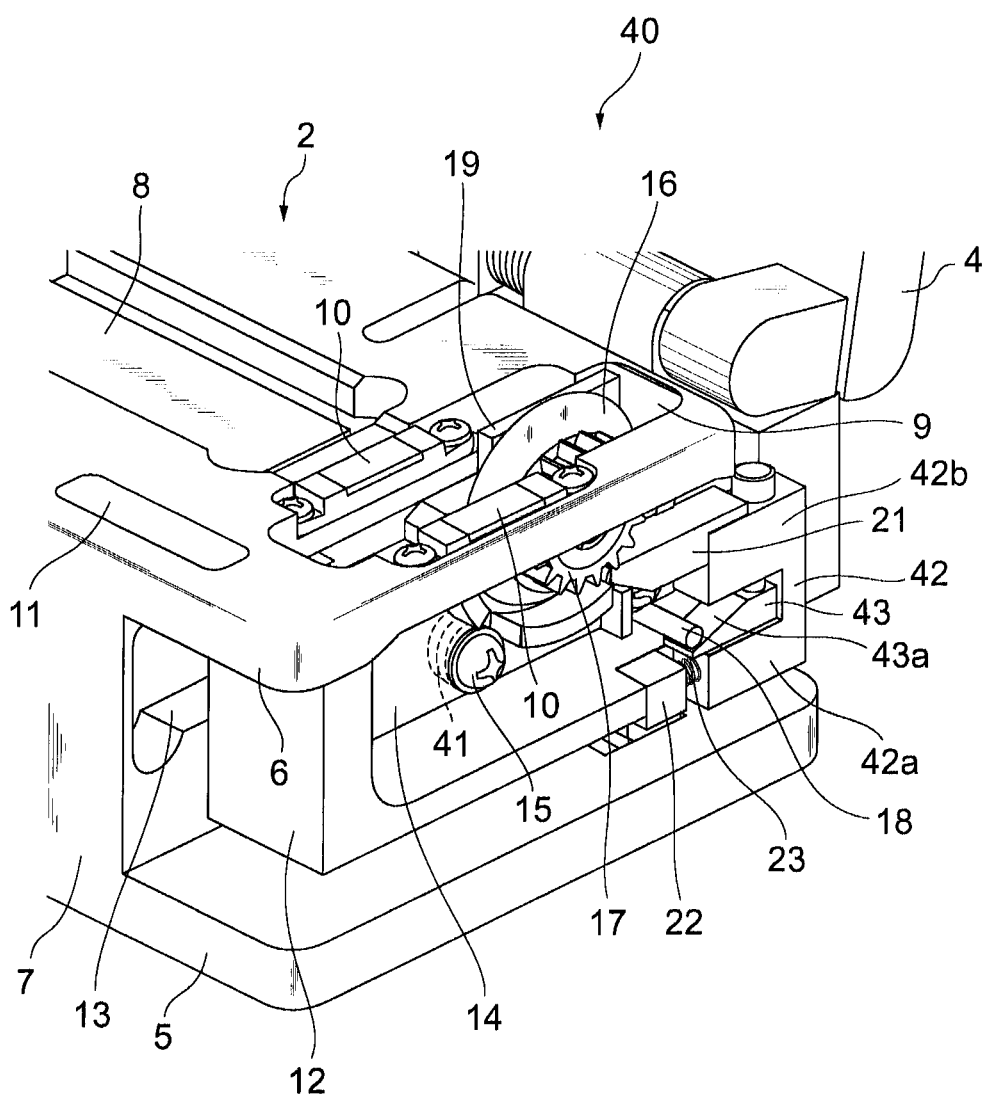
FIG. 6 is a perspective view illustrating a part of a fiber cleaver according to a second embodiment of the present invention.

FIG. 6 is a perspective view illustrating a part of a fiber cleaver 40 according to a second embodiment of the present invention. As with the fiber cleaver 1, the fiber cleaver 40 includes the circular-blade-mounting bracket 14. Unlike that of the fiber cleaver 1, the circular-blade-mounting bracket 14 is attached to the slider 12 with fixing springs 41, the fixing springs 41 being provided around the thread portions of the two screws 15, respectively. Therefore, the circular-blade-mounting bracket 14 is movable vertically with respect to the slider 12.

The fiber cleaver 40 further includes, instead of the columnar protrusion 20, a U-shaped protrusion 42 including a lower wall portion 42a and an upper wall portion 42b. The upper surface of the lower wall portion 42a is substantially flush with the upper surface of the engaging member 22. A wedge 43 is provided on the upper surface of the lower wall portion 42a. The wedge 43 has a slant face 43a slanting upward from the front side toward the rear side of the main body 2. The slant face 43a engages with the pin 18 having a columnar shape and provided on the circular-blade-mounting bracket 14. The engaging member 21 is attached to the upper wall portion 42b.

Figure 7:
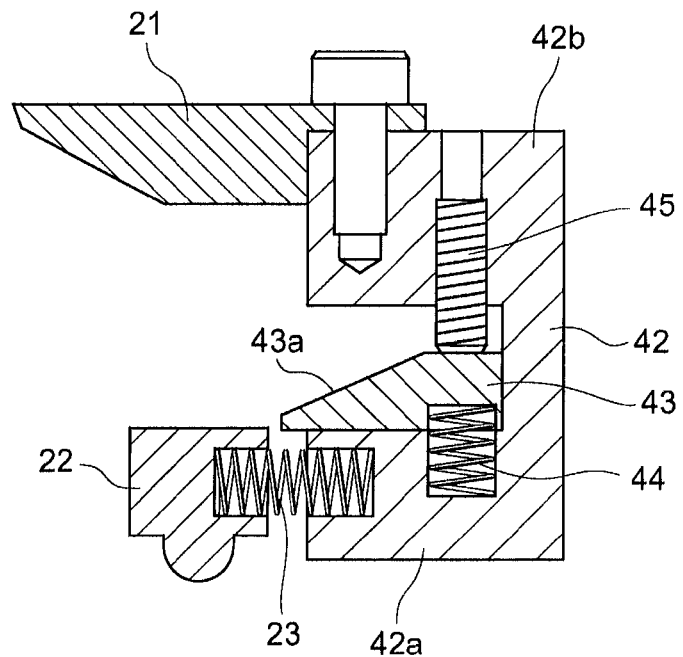
FIG. 7 is a cross-sectional view illustrating a part of the fiber cleaver according to the second embodiment including a U-shaped protrusion.

FIG. 7 is a cross-sectional view illustrating a part of the fiber cleaver 40 including the U-shaped protrusion 42. A spring 44 that pushes up the wedge 43 is embedded in the lower wall portion 42a. An adjusting screw 45 for adjusting the level of the circular-blade-mounting bracket 14 with respect to the slider 12 is screwed in the upper wall portion 42b. The lower end of the adjusting screw 45 is in contact with the upper surface of the wedge 43. The length of movement of the pin 18 along the slant face 43a of the wedge 43 is adjusted with the adjusting screw 45, whereby the level of the circular-blade-mounting bracket 14 with respect to the slider 12 is adjustable.

Figure 8:
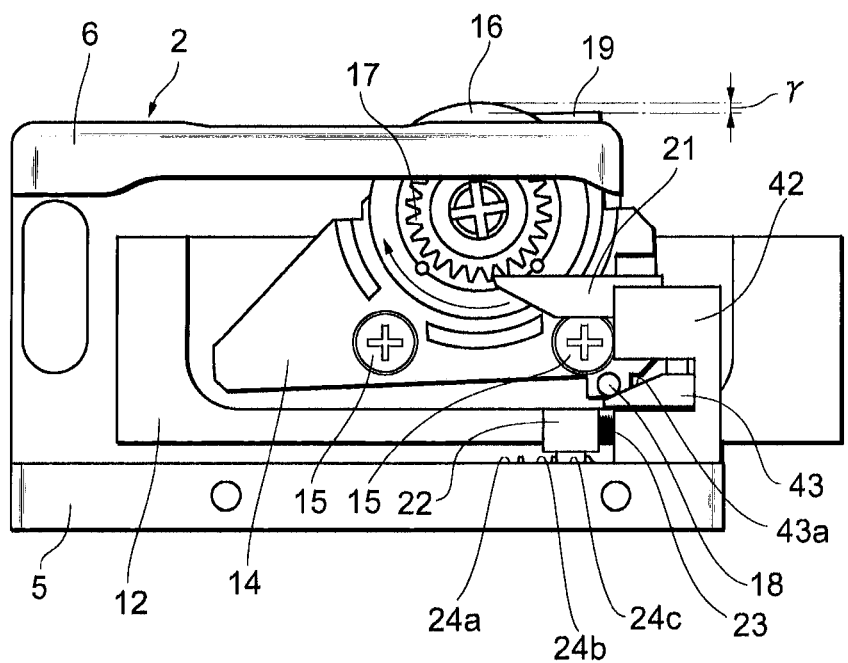
FIG. 8 is a side view of the main body of the fiber cleaver according to the second embodiment in a state where the circular blade is being raised.

When the fiber cleaver 40 is in a state where the engaging member 22 is anchored at the third recessed portion 24c, the pin 18 is in contact with the slant face 43a of the wedge 43. In this state, when the slider 12 is further pushed toward the rear, the pin 18 goes up the slant face 43a (FIG. 8). Therefore, the circular-blade-mounting bracket 14 moves upward with respect to the slider 12. As a result, the circular blade 16 is raised. Here, an amount of rising γ of the circular blade 16 is arbitrarily adjustable with the adjusting screw 45. Meanwhile, the fixing springs 41 retain the position of the circular-blade-mounting bracket 14 with respect to the slider 12.

In the above configuration, the circular-blade-mounting bracket 14, the screws 15, the pin 18, the fixing springs 41, the U-shaped protrusion 42, and the wedge 43 in combination form a circular-blade-raising means that raises the circular blade 16 with respect to the slider 12 after the circular blade 16 is rotated by the circular-blade-rotating means (described above). With this configuration, the circular blade can be raised with respect to the slider in a simple manner.

As described above, according to the second embodiment, if it becomes difficult to make a flaw in an optical fiber at any point of the circular blade because the circular blade 16 has become dull over the entirety of the circumference thereof, the slider 12 is further pushed toward the rear from the state where the engaging member 22 is anchored at the third recessed portion 24c. As a result, the circular blade 16 is raised, whereby a flaw can be assuredly made in the optical fiber. Thus, the circular blade 16 becomes usable more efficiently. Hence, the life of the circular blade 16 can be extended, and the circular blade 16 can be used more efficiently. Furthermore, the circular blade 16 can be raised by simply moving the slider 12 toward the rear. Therefore, the workload imposed on the worker does not increase.

The present invention is not limited to the above embodiments. For example, the engaging member 22 that engages with the slider 12 does not necessarily have a configuration including a spring member such as the one described above and may include a latch mechanism, a gear mechanism, or the like. Furthermore, the angle of rotation of the circular blade 16 may be changed between two angles or among four or more angles including zero degrees. Moreover, the angle of rotation of the circular blade 16 may be changed continuously with the position of the slider 12 with respect to the main body 2.

CITATION LIST

Patent Literature

PTL 1: Japanese Unexamined Patent Application Publication No. 2001-296430

The invention claimed is:

1. A fiber cleaver comprising:
   a main body including a fiber guiding portion that positions an optical fiber;
   a slider movably provided to the main body;
   a circular blade rotatably provided to the slider and configured to make a flaw in the optical fiber; and
   a circular-blade-rotating means configured to change the angle of rotation of the circular blade in accordance with the position of the slider that is moved in one direction with respect to the main body, the circular blade rotating means including:
   a rotary member configured to rotate together with the circular blade;
   a protrusion fixed to the main body and including an engaging portion configured to engage with the rotary member;
   an engaging member being configured to engage with the slider; and
   a plurality of anchoring portions provided to the main body and each configured to anchor the engaging member.

2. The fiber cleaver according to claim 1, wherein the engaging member provided to the protrusion with an elastic member interposed therebetween.

3. The fiber cleaver according to claim 1, further comprising a circular-blade-raising means configured to raise the circular blade with respect to the slider after the circular blade is rotated by the circular-blade-rotating means.

4. The fiber cleaver according to claim 3, wherein the circular-blade-raising means includes
   a circular-blade-mounting bracket provided to the slider in such a manner as to be movable vertically and to which the circular blade is attached;
   a wedge fixed to the main body and having a slant face slanting upward in the one direction; and
   an engaging pin provided to the circular-blade-mounting bracket and configured to engage with the slant face.

5. A fiber cleaver comprising:
   a main body including a fiber guiding portion that positions an optical fiber;
   a slider movably provided to the main body;
   a circular blade rotatably provided to the slider and configured to make a flaw in the optical fiber;
   a circular-blade-rotating means configured to change the angle of rotation of the circular blade in accordance with the position of the slider that is moved in one direction with respect to the main body; and
   a circular-blade-raising means configured to raise the circular blade with respect to the slider after the circular blade is rotated by the circular-blade-rotating means, the circular-blade-raising means including:
   a circular-blade-mounting bracket provided to the slider in such a manner as to be movable vertically and to which the circular blade is attached;
   a wedge fixed to the main body and having a slant face slanting upward in the one direction; and
   an engaging pin provided to the circular-blade-mounting bracket and configured to engage with the slant face.

* * * * *